(12) United States Patent  (10) Patent No.: US 7,184,261 B2
Chung  (45) Date of Patent: Feb. 27, 2007

(54) COMPUTER CASE

(75) Inventor: Cheng-Kuang Chung, Tu-Cheng (TW)

(73) Assignee: Hon Hai Precision Industry Co., Ltd. (TW)

( * ) Notice: Subject to any disclaimer, the term of this patent is extended or adjusted under 35 U.S.C. 154(b) by 249 days.

(21) Appl. No.: 10/988,301

(22) Filed: Nov. 12, 2004

(65) Prior Publication Data
US 2005/0185370 A1 Aug. 25, 2005

(30) Foreign Application Priority Data
Feb. 20, 2004 (TW) .............................. 93202448 U

(51) Int. Cl.
G06F 1/16 (2006.01)
(52) U.S. Cl. ..................................... 361/683
(58) Field of Classification Search ................. 361/683
See application file for complete search history.

(56) References Cited

U.S. PATENT DOCUMENTS

| 5,116,261 | A |   | 5/1992  | Lan et al.     |         |
|-----------|---|---|---------|----------------|---------|
| 5,306,079 | A | * | 4/1994  | Liu            | 312/223.2 |
| 5,380,990 | A | * | 1/1995  | Baitz et al.   | 312/333 |
| 5,701,231 | A | * | 12/1997 | Do et al.      | 361/683 |
| 5,926,916 | A |   | 7/1999  | Lee et al.     |         |
| 5,999,416 | A | * | 12/1999 | McAnally et al.| 361/683 |
| 6,158,105 | A | * | 12/2000 | Suh            | 312/223.2 |
| 6,246,572 | B1| * | 6/2001  | Myers et al.   | 361/683 |
| 6,327,151 | B1| * | 12/2001 | Chen et al.    | 361/726 |
| 6,392,874 | B1| * | 5/2002  | Gan            | 361/683 |
| 6,654,236 | B2| * | 11/2003 | Chen et al.    | 361/683 |
| 6,711,009 | B2| * | 3/2004  | Lee et al.     | 361/683 |
| 6,775,144 | B2| * | 8/2004  | Gan et al.     | 361/727 |
| 6,781,843 | B2| * | 8/2004  | Liu et al.     | 361/726 |
| 2002/0159229 | A1 | * | 10/2002 | Searby et al. | 361/683 |

FOREIGN PATENT DOCUMENTS

TW         454892         9/1990

* cited by examiner

Primary Examiner—Lisa Lea-Edmonds
(74) Attorney, Agent, or Firm—Morris, Manning & Martin; Tim Tingkang Xia, Esq.

(57) ABSTRACT

A computer case includes a chassis (10), a cover (60) and a lock (80). The chassis comprises a bottom panel (12), two side panels (14) and a front panel (16), the bottom panel engaging two first support members (40) and a second support member (52) between the first ones. Each of the side panels defines a fixing slot (19). The cover defines two fixing apertures (63) in respective opposite sides. The lock comprises an operating member (90) getting through the front panel, and two locking bars (100). Each of the locking bars is supported between the first and the second support members. The locking bars are connected by a spring (110). In assembly, each of the apertures aligns with the fixing slot, and the pushing part pushes the locking bars successively getting through the aperture and slot, thereby mounting the cover to the chassis.

21 Claims, 7 Drawing Sheets

COMPUTER CASE

BACKGROUND OF THE INVENTION

1. Field of the Invention

The present invention relates to a computer case, and more particularly to a computer case with a simplified configuration and convenient to use.

2. Description of Related Art

A typical computer case usually engages to a computer cover or a bezel with a plurality of screws directly. However, screwdrivers or other detaching tooling are necessary for installation or removal of the screws in assembly or disassembly processes, which causes inconvenience and time-consuming issues.

A typical improved computer case is disclosed in Taiwan patent publication No. 454,892. The computer case comprises a bezel, a cover and a chassis. The bezel is connected with the cover and the combined bezel and cover are mounted to the chassis by an engaging means. Each engaging means comprises a coupling interface, a mounting hole, a pressing member and a spring. The interface is formed on two side edges of the bezel. The mounting hole is defined in a front portion of the chassis corresponding to the respective interface. The pressing member is received in the interface of the bezel. The member comprises a base, a barb extending from the base and a post formed at an interior wall of the base. The post is engaged with the spring. In assembly, press down the pressing member in a direction toward the interior of the bezel, the spring is compressed and the barb engaged to the bezel can be received in the mounting hole in the chassis, thereby mounting the bezel to the chassis.

However, the conventional computer case disclosed above must engage at least one barb or some similar configuration to complete the engaging apparatus between the bezel and the chassis, which causes unduly inconvenience and unduly time-consuming issues in computer case assembly or disassembly process. In addition, the engaging means of the bezel to the chassis is utilizing a spring to keep the barb clasping the chassis in the mounting hole, which causes insufficient strength issue in assembly of the bezel. Moreover, on condition that the cover of the computer case engages more and more modules such as hard disk drives, Compact Disk-Read Only Memory (CD-ROM) drives and so on, the joint of the cover must be strong enough to support the extra load of the modules under the cover. In the conventional computer case the load of the cover is mainly supported by the barbs of the pressing members, so deformation or breaking off of the barbs often occurs.

SUMMARY OF THE INVENTION

Accordingly, an object of the present invention is to provide a computer case with a simplified configuration, and convenient to use.

To achieve the above object, the chassis comprises a bottom panel, two side panels, a front panel and a cover. The bottom panel engages two first support members and a second support member between the first ones. Each of the side panels defines a fixing slot corresponding to the first support member. The cover defines two fixing apertures in respective opposite sides. Each of the first support members defines a through aperture, the second support member comprises a mounting flake and two locating flakes respectively extending from free ends thereof in a perpendicular direction, and each of the locating flakes defines a narrow slot. The lock comprises an operating member retaining in the front panel, and two locking bars. The operating member includes a support base, an exterior part extending from an end of the support base and a pushing part formed from the other end of the support base. Each of the two locking bars is supported between the first and the second support members in the through aperture and the narrow slot. The locking bars are connected by a spring, and the pushing part stands between the locking bars. As the cover covers on the chassis, each of the apertures of the cover aligns with the fixing slot of the chassis. When rotating the operating member, the pushing part of the operating member pushes the locking bars successively extending through the aperture and slot, thereby mounting the cover to the chassis.

Other objects, advantages and novel features of the present invention will be drawn from the following detailed description of preferred embodiment of the present invention with the attached drawings, in which:

DETAILED DESCRIPTION OF THE INVENTION

Figure 1:
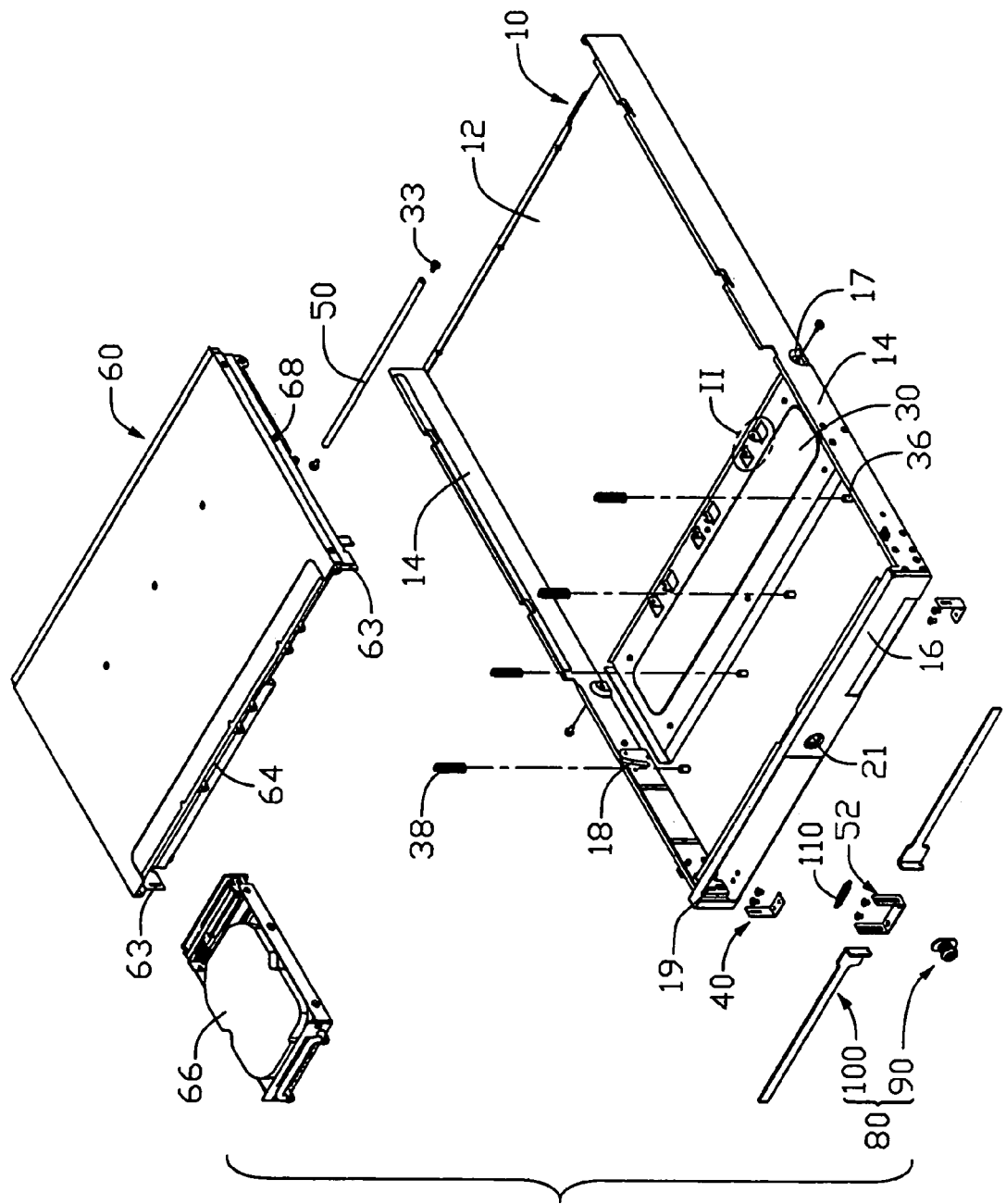
FIG. 1 is an exploded, isometric view of a computer case in accordance with a preferred embodiment of the present invention comprising a chassis, a cover and a lock.

Referring to FIG. 1, a computer case in accordance with the preferred embodiment of the present invention comprises a chassis 10, a cover 60 pivotally engaged to the chassis 10, and a lock 80.

The chassis 10 comprises a bottom panel 12, and two perpendicular side panels 14 respectively extending from two opposite edges (not labeled) of the bottom panel 12. A front panel 16 vertically extends from the bottom panel 12 at a front edge thereof. Each side panel 14 forms a rotating base 17 in the middle portion. Each side panel 14 further defines an arc-shaped guiding slot 18 before the rotating base 17, and a fixing aperture 19 in the front end-portion thereof. The front panel 16 defines a mounting opening 21 in the middle.

Figure 2:
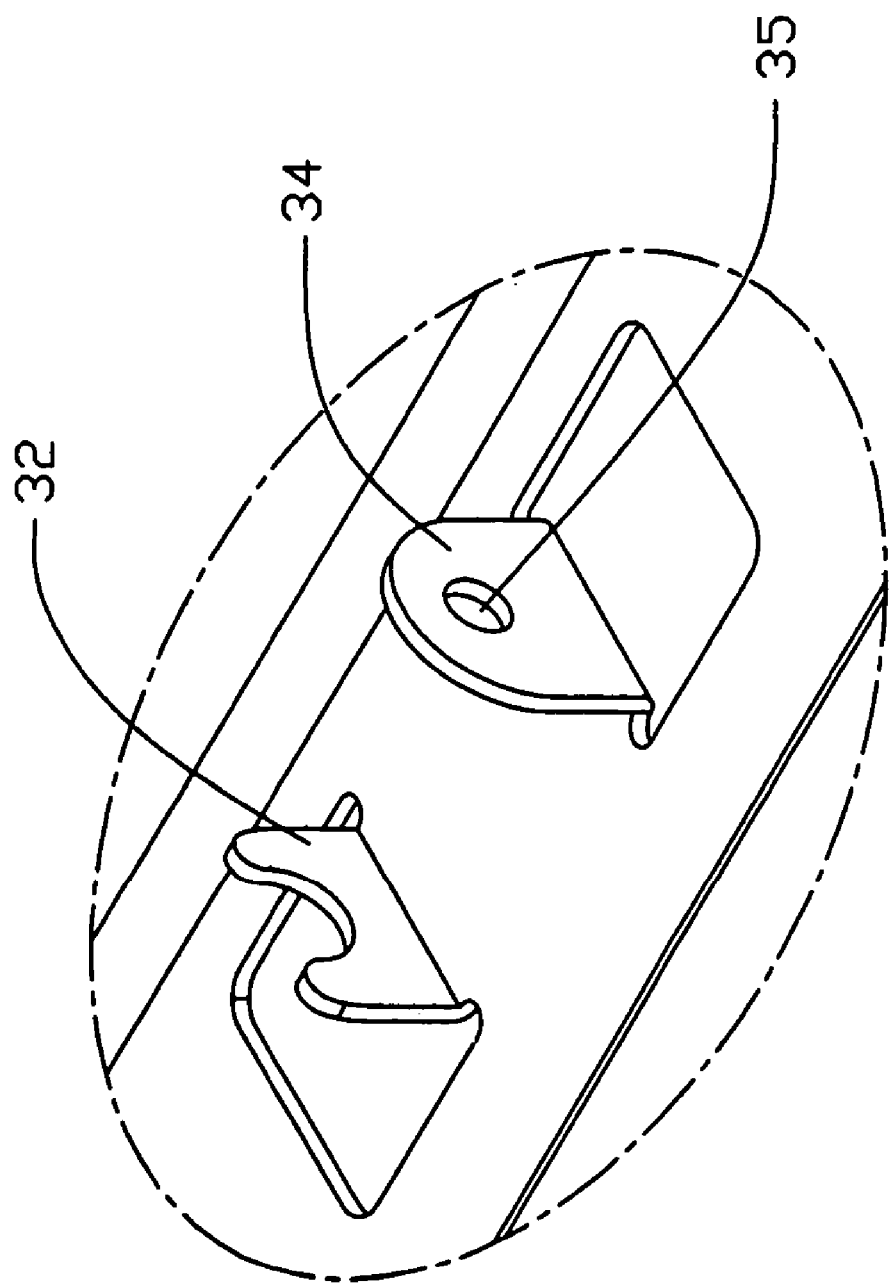
FIG. 2 is an enlarged view of an encircled portion II of FIG. 1, showing details of a supporting tab and a fixing tab of the chassis.

Referring also to FIG. 2, the bottom panel 12 of the chassis 10 is engaged with a substantially rectangular base plate 30, and forms a row of pillars 36 neighboring the plate 30. Each pillar 36 is surrounded by a spring 38. The plate 30 forms a row of supporting tabs 32 and a pair of fixing tabs 34 respectively located at two ends of the row of supporting tabs 32. Each supporting tab 32 defines a cutout (not labeled). Each fixing tab 34 defines a fixing hole 35. A support rod 50 lying in the cutouts of the supporting tabs 32 defines a screw hole (not shown) in each end thereof.

Figure 4:
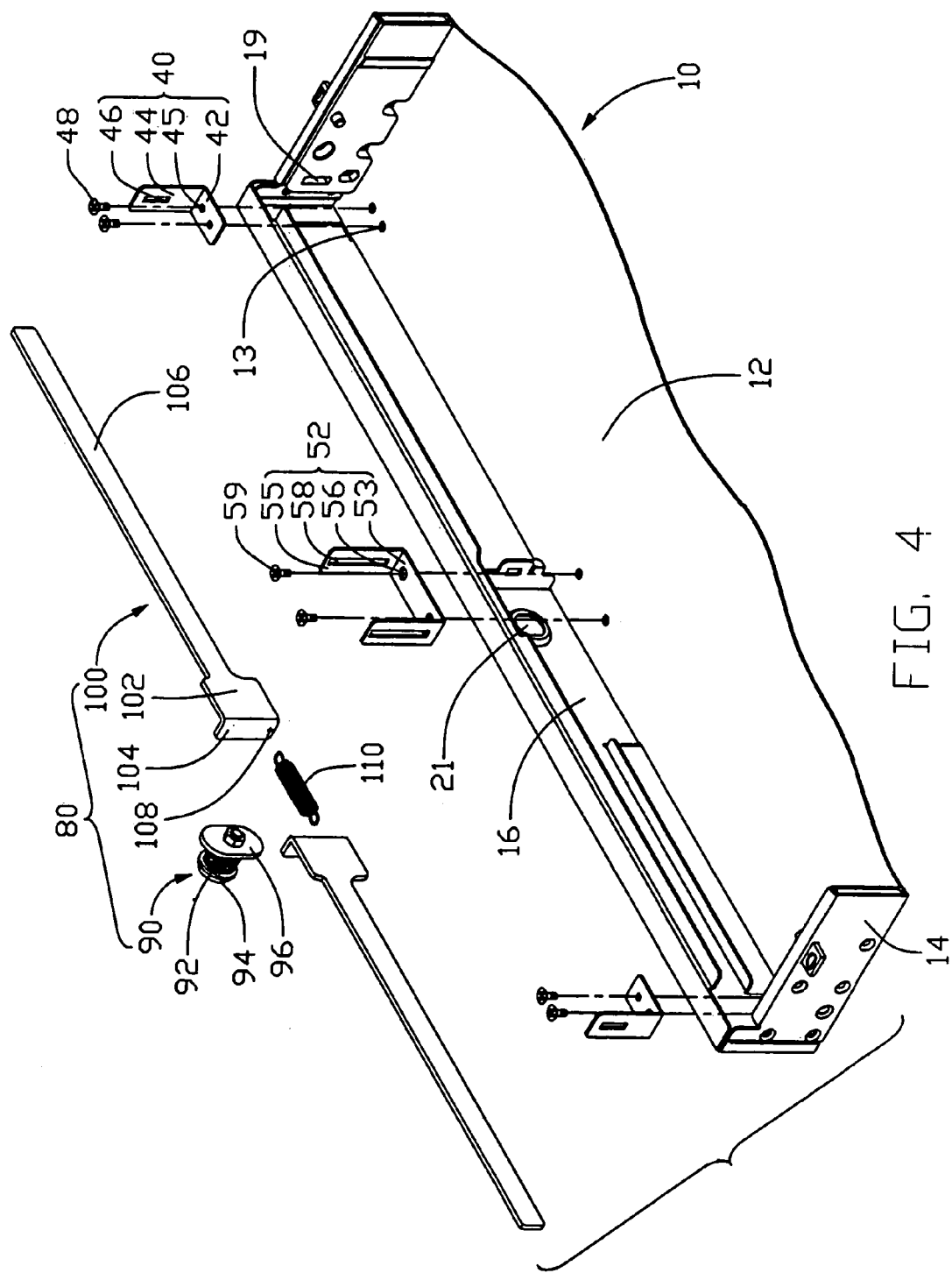
FIG. 4 is an exploded, isometric view of the lock, showing the assembled relationship between the lock and the chassis.

Referring to FIG. 4, the bottom panel 12 defines a plurality of screw holes 13 in the bottom panel 12 adjacent to the front panel 16. A pair of first support members 40 is respectively mounted to the front portion of chassis 10. Each first support member 40 is substantially L-shaped, and comprises a mounting piece 42 and a supporting piece 44 perpendicularly extending from a distal end of the mounting piece 42. The mounting piece 42 defines a pair of fixing holes 45 corresponding to a pair of the screw holes 13 of the bottom panel 12. Each supporting piece 44 defines a through aperture 46.

A second support member 52 is mounted to the bottom panel 12. The second support member 52 comprises a horizontal fixing flake 53, and two locating flake 55 upwardly extends from respective two free ends of the fixing flake 53. The fixing flake 53 further defines a pair of fixing hole 56. Each locating flake 55 defines a narrow slot 58.

Figure 3:
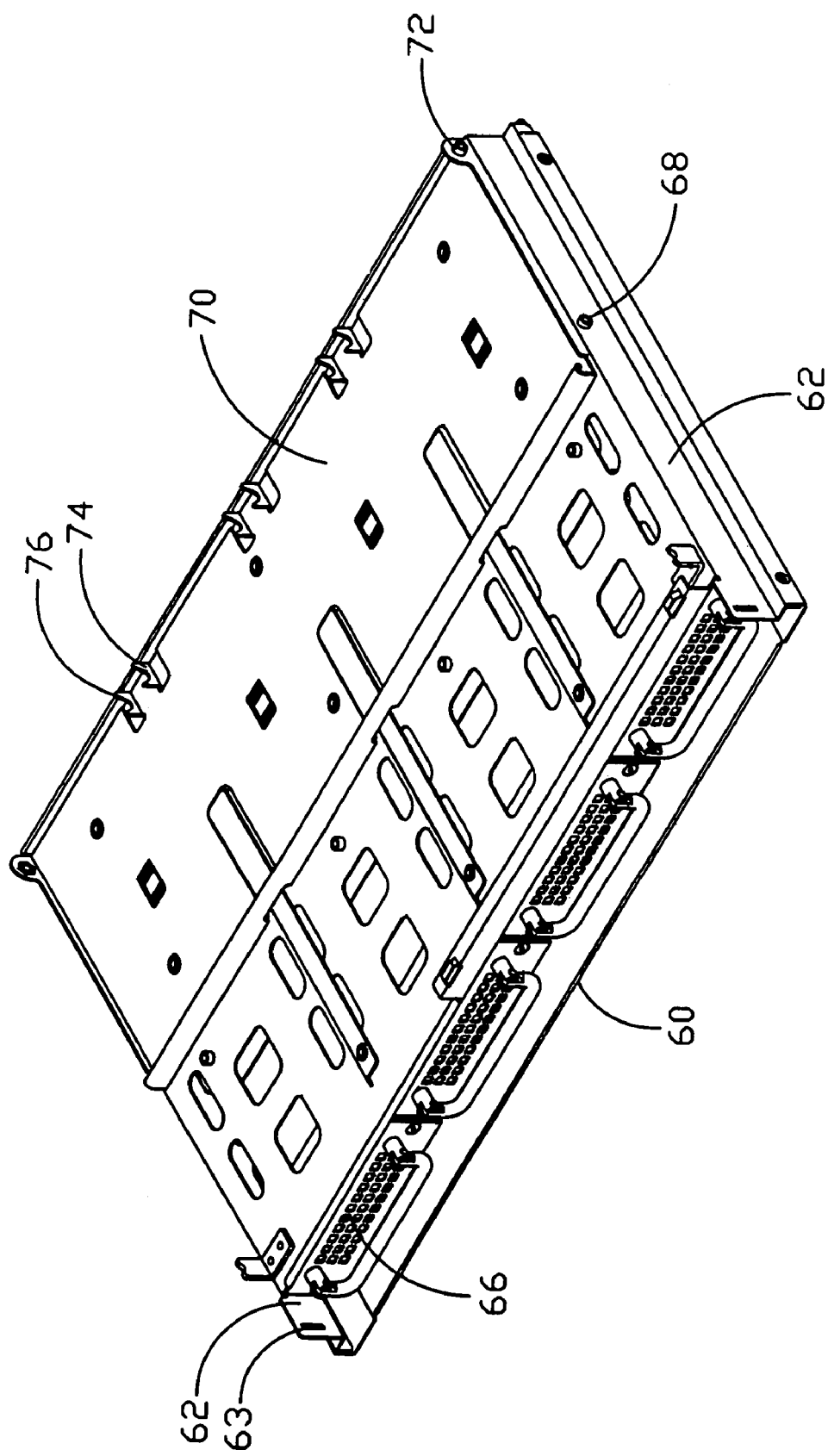
FIG. 3 is an assembled view of the cover, viewed from another aspect.

Referring to FIG. 3, two flanges 62 respectively extend from two opposite sides of the cover 60. Each flange 62 forms a guiding protrusion 68 for sliding in the arc-shaped slot 18 of the side panel 14. A fixing aperture 63 is defined in a front portion of each flange 62, in alignment with a corresponding fixing aperture 19, so that the lock 80 can successively get through the fixing apertures 19, 63. A plurality of receiving spaces 64 (referring to FIG. 1) is defined between the two opposite flanges 62 under the cover, for receiving various/multiple data storage devices 66. A minor panel 70 is attached to the cover 60 underneath the receiving spaces 64. The panel 70 forms a pair of shafts 72 engaged to the pair of rotating base 17 on the side panel 14. The minor panel 70 forms a row of supporting tabs 74, corresponding to the rod 50. Each supporting tab 74 defines a cutout 76.

Referring to FIG. 4, the lock 80 comprises an operating member 90 and two locking bars 100. The operating member 90 is rotatably supported in the mounting opening 21 of the front panel 16. The operating member 90 has a support base 92. The base 92 engages with an exterior part 94 at one free end thereof, and the exterior part 94 defines a key hole (not shown). The base 92 engages with an elliptic, interior pushing part 96 at the other free end thereof, and the pushing part 96 is driven by the exterior part 94 to rotate.

The locking bars 100 are respectively supported between the first support member 40 and the second support member 52. Each bar 100 comprises a sliding portion 102 received in the slot 58, a connecting portion 104 vertically extending from the sliding portion 102, and a long locking arm 106 joining to the sliding portion 102. Each connecting portion 104 defines a mounting hole 108 at the bottom thereof. Two free ends of a spring 110 respectively clasp the connecting portion 104 in the mounting holes 108.

Figure 5:
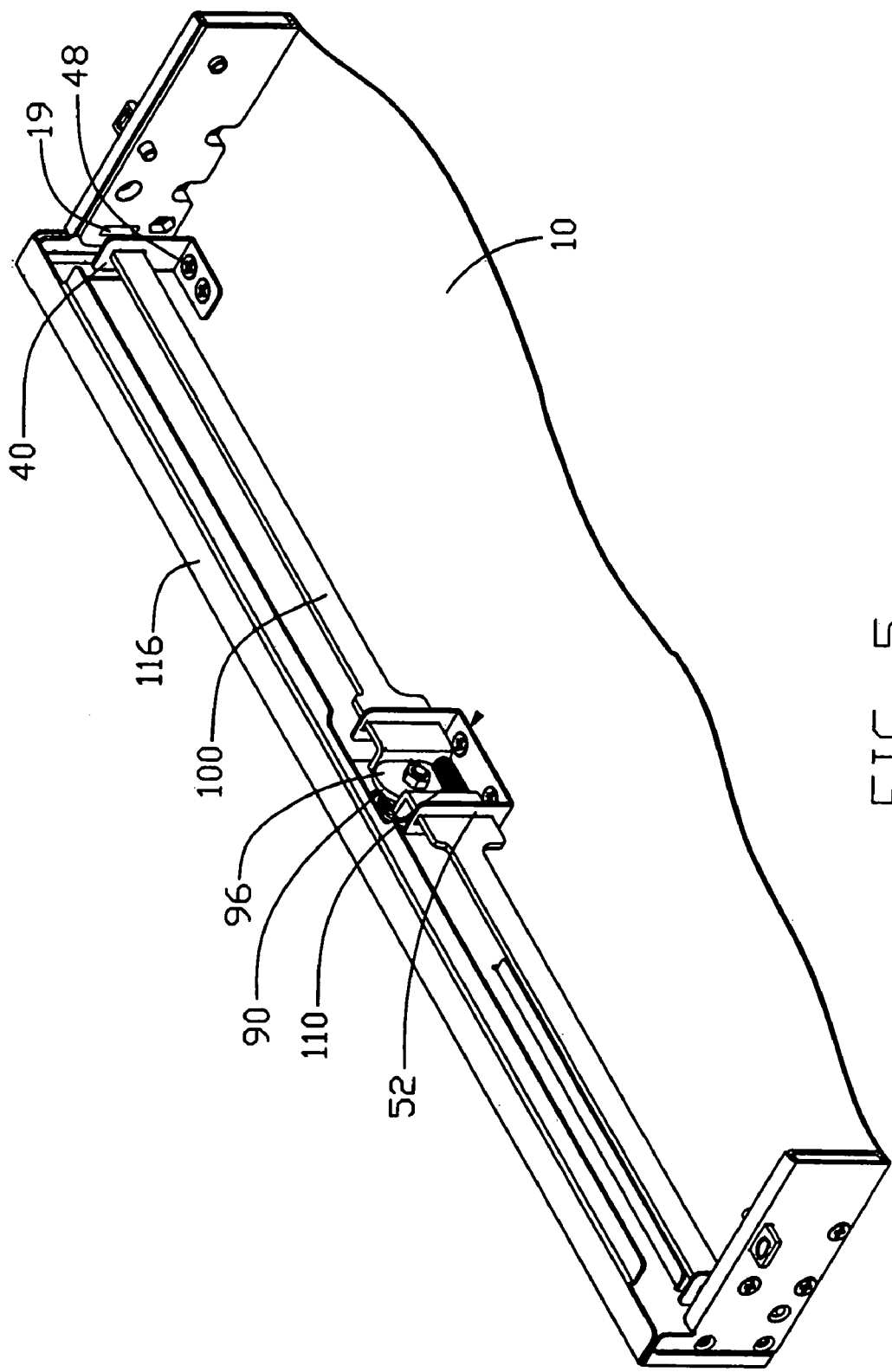
FIG. 5 is an assembled view of FIG. 4, with partly cut off for better illustration.
Figure 6:
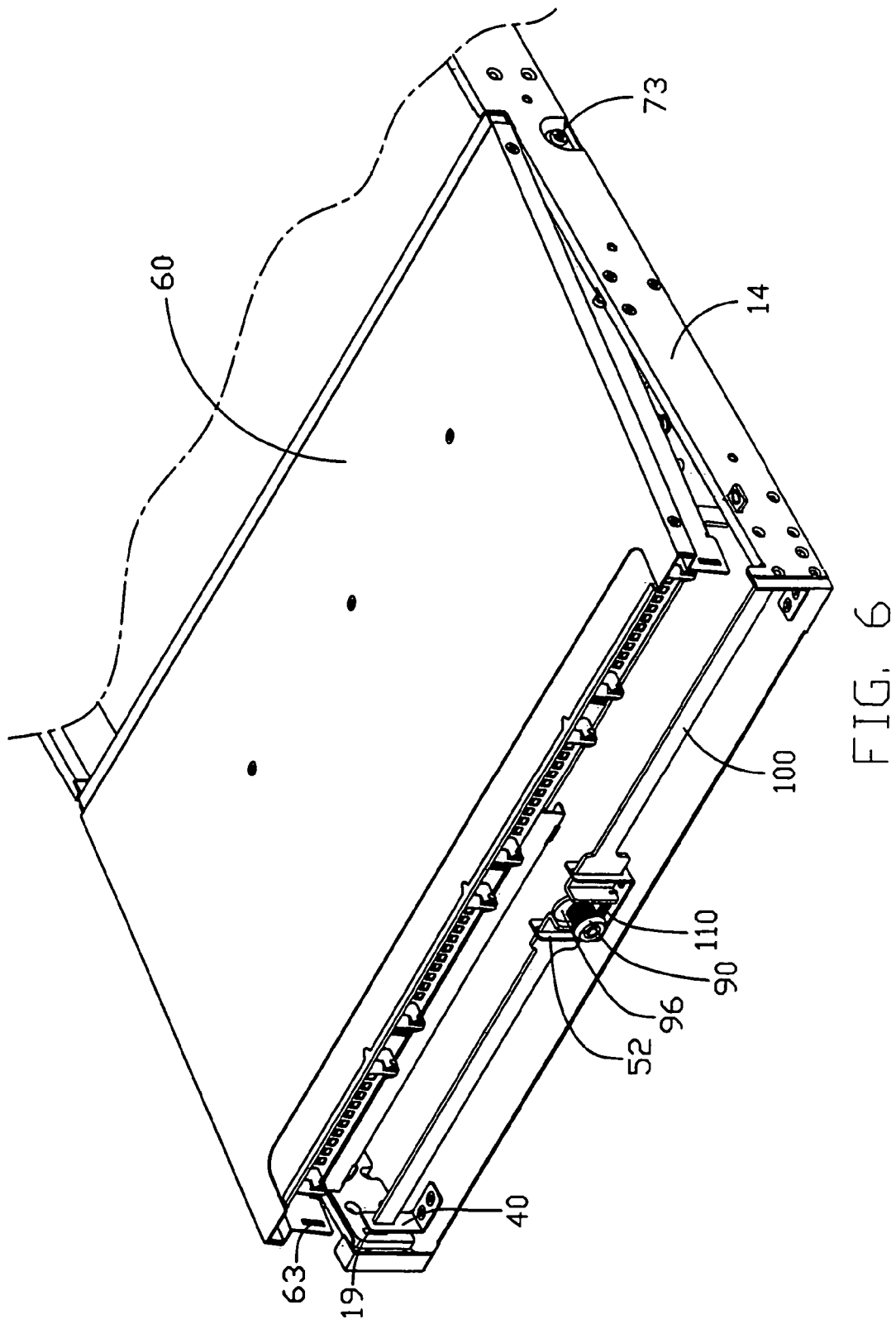
FIG. 6 is an assembled view of FIG. 1, showing the first state of the cover.
Figure 7:
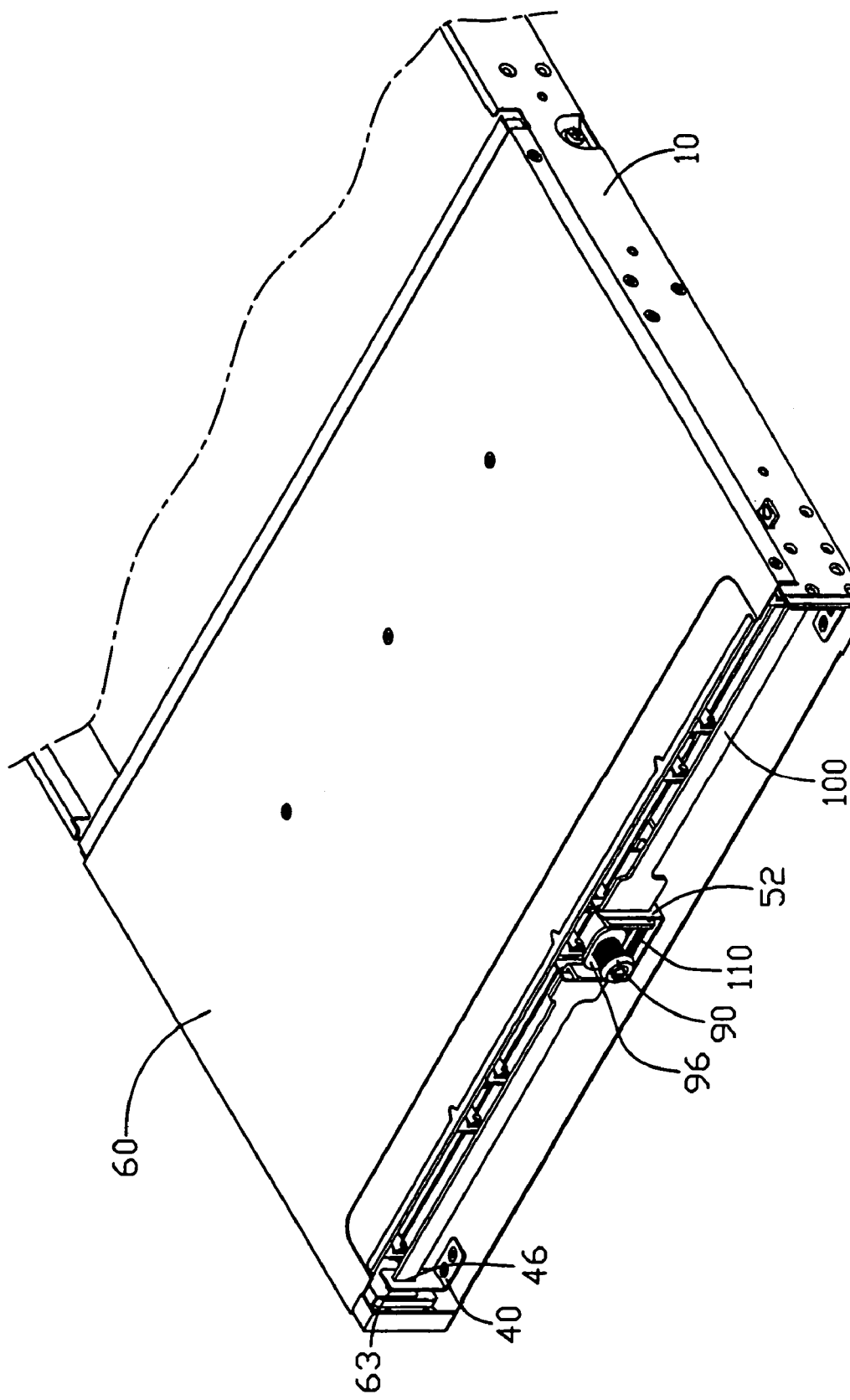
FIG. 7 is an assembled view of FIG. 1, showing the second state of the cover.

Referring to FIGS. 4–6, in assembly, the plural data storage devices 66 are respectively received in the receiving spaces 64 under the cover 60. The base plate 30 is mounted on the bottom plate 12 of the chassis 10. The rod 50 lies in the cutouts (not labeled) of the supporting tabs 32, and two nail screws 33 respectively penetrate through the fixing holes 35 of the fixing tabs 34, and engage with the screw hole (not shown) of the rod 50, thereby mounting the rod 50 to the chassis 10. The shafts 72 of the panel 70 respectively engage to the corresponding rotating bases 17 on the side panels 14, thereby rotatably connecting the cover 60 to the chassis 10. When the cover 60 rotates to the chassis 10, the supporting tabs 74 of the minor panel 70 under the cover 60 come to fit on the rod 50, receiving the rod 50 in the cutout 76 and rotating with the cover 60, thereby sharing the load of the cover 60 on the rotating base 17 and preventing the shaft 72 or the base 17 from deformation and breaking off.

A pair of screws 48 respectively gets through the fixing holes 45 of the first support member 40 and are received in the screw holes 13, thereby fixing the first support members 40 on the chassis 10. A pair of screws 59 gets through the fixing holes 56 of the second support member 52 and is received in corresponding screw holes 13, thereby fixing the second support member 52 on the chassis 10.

The operating member 90 of the lock 80 is supported in the mounting opening 21 of the front panel 16, and the pushing part 96 of the operating member 90 is located in the middle of the second support member 52 between the two connecting portions 104. Two free ends of the spring 110 respectively clasp the connecting portion 104 in the mounting holes 108, thereby establishing an elastic connection between the two locking bars 100. Each of the locking arms 106 extends until reaching to the corresponding first support member 40, getting through the aperture 46 of the first support member 40, and facing the fixing aperture 19 of the side panel 14.

When the cover 60 rotates toward the chassis 10, each of the guiding protrusions 68 slides into the arc-shaped slot 18 and each fixing aperture 63 of the flange 62 comes to align with the fixing aperture 19 and the through aperture 46 and is located therebetween. The elliptic pushing portion 96 of the operating member 90 is rotated to push each locking bar 100 moving in a horizontal direction, and make each locking arm 106 successively get through the apertures 63, 46 and 19, thereby locking the cover 60 to the chassis 10. When the cover 60 is locked, the spring 110 between the two locking bars 100 is stretched.

In disassembly, the elliptic pushing portion 96 of the operating member 90 is rotated to allow reinstatement of the spring 110. The reinstated spring 110 drags the engaging locking bars 100 withdrawing successively from the apertures 63, 46 and 19 in a horizontal direction, thereby allowing detachment of the cover 60 from the chassis 10.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

What is claimed is:

1. A computer case comprising:
   a chassis comprising a bottom panel, two side panels and a front panel, two first support members arranged on the bottom panel and a second support member between the first ones, each of the side panels defining a first fixing aperture corresponding to the first support member;
   a cover pivotally attached to the chassis, the cover having two opposite flanges each defining a second fixing aperture corresponding to the first fixing aperture, each of the second fixing apertures located between the first support member and the first fixing aperture of the side panel; and
   a lock comprising an operating member getting through the front panel, and two locking bars, each of the locking bars supported between the first and the second support members, the locking bars connected by a resilient member, the operating member comprising a pushing part, the pushing part pushing each of the locking bars successively getting through the first and second fixing apertures, thereby mounting the cover to the chassis.

2. The computer case as claimed in claim 1, wherein each side panel of the chassis forms a rotating base for pivotally engaging the cover.

3. The computer case as claimed in claim 2, wherein an arc-shaped slot is defined in each of the side panels in front of the rotating base, and a guiding protrusion is formed from the flange of the cover to slide into the arc-shaped slot therein.

4. The computer case as claimed in claim 1, wherein the front panel of the chassis defines a mounting opening in the middle portion for the lock extending therethrough.

5. The computer case as claimed in claim 1, wherein each of the first support members is L-shaped, and comprises a mounting piece and a supporting piece perpendicularly extending from an edge portion of the mounting piece.

6. The computer case as claimed in claim 5, wherein the supporting piece defines a through aperture for receiving the corresponding locking bar.

7. The computer case as claimed in claim 1, wherein the second support member comprises a fixing flake, and two locating flakes vertically extend from respective free ends of the fixing flake.

8. The computer case as claimed in claim 7, wherein each locating flake of the second support member defines a narrow slot for receiving the locking bars.

9. The computer case as claimed in claim 1, wherein the operating member further comprises a support base supported by the front panel and an exterior part extending from an end of the support base, the pushing part is formed from the other end of the support base.

10. The computer case as claimed in claim 1, wherein the pushing part is elliptic, and when the pushing part is rotated, it pushes the locking bars successively getting through the first and second fixing apertures, thereby mounting the cover to the chassis.

11. The computer case as claimed in claim 1, wherein each of the locking bars comprises a sliding portion received in corresponding narrow slot of the second support member, a connecting portion engaging the spring, and a long locking arm for insertion into first fixing aperture in the side panel through the second fixing aperture of the cover.

12. A computer case comprising:
a chassis comprising a bottom panel, a front panel, and two opposite side panels, each of the side panels defining a first fixing aperture;
a cover pivotally connected to a rear portion of the chassis, the cover having two opposite flanges each defining a second fixing aperture corresponding to the first fixing aperture;
a plurality of support members arranged on the bottom panel; and
a lock comprising:
an operating member pivotally supported by the front panel, with an exterior pad exposed outside the front panel and an interior pushing part inside the front panel; and
two locking bars supported by and horizontally slidable on the support members, two neighboring ends of the locking bars connected by a resilient member and sandwiching the pushing part; wherein
the operating member is rotated so that the pushing pan pushes the locking bars away from each other to extend through corresponding first and second fixing apertures, thereby locking the cover to the chassis.

13. The computer case as claimed in claim 12, wherein the pushing part is elliptic, when the pushing part is rotated, it pushes the locking bars successively getting through the first and second fixing apertures.

14. The computer case as claimed in claim 12, wherein each side panel of the chassis forms a rotating base for pivotally engaging the cover, and defines an arc-shaped slot in front of the rotating base, where a guiding protrusion is formed from the flange of the cover to slide into the arc-shaped slot therein.

15. The computer case as claimed in claim 12, wherein the support members arranged near the side panel is L-shaped, and comprises a mounting piece and a supporting piece with a through aperture for receiving the locking bar, the supporting piece perpendicularly extending from an edge of the mounting piece.

16. The computer case as claimed in claim 12, wherein the support members arranged in the middle comprises a fixing flake, and two locating flakes vertically extend from respective free ends of the fixing flake, each locating flake defines a narrow slot for receiving the locking bars.

17. The computer case as claimed in the claim 12, wherein the operating member further comprises a support base supported by the front panel and an exterior part extending from an end of the support base, the pushing part is formed from the other end of the support base.

18. The computer case as claimed in the claim 12, wherein each locking bar comprises a sliding portion, a connecting portion engaging the resilient member, and a long locking arm for insertion into first fixing aperture in the side panel through the second fixing aperture of the cover.

19. A computer case comprising:
a chassis defining an inner space therein;
a cover pivotally attached to said chassis at one side thereof, said cover having a receiving space thereof for receiving at least one device therein, and said at least one device movable together with said cover so as to move into said inner space of said chassis due to pivoting of said cover relative to said chassis; and
a lock comprising an operating member and at least one locking bar installed in said chassis, said at least one locking bar resiliently movable toward said cover to fix said cover to said chassis in a first position thereof, and resiliently movable away from said cover to allow said pivoting of said cover in a second position thereof, said operating member adapted to engage with said at least one locking bar so as to drive said at least one locking bar moving between said first and second positions, wherein said lock further comprises another locking bar resiliently attached to said at least one locking bar and movable toward said cover to fix said cover to said chassis in a direction opposing to said at least one locking bar.

20. The computer case as claimed in claim 19, wherein said operating member has an elliptic pushing part to rotatably engage with said at least one locking bar in order to drive said at least one locking bar moving aside.

21. The computer case as claimed in claim 19, wherein a rod is formed along said one side of said cover, and engagable with a plurality of supporting tabs extending from said cover during said pivoting of said cover.

* * * * *